W. E. GRAHAM.
COMBINED WHEEL GUARD AND SLEIGH RUNNER.
APPLICATION FILED SEPT. 29, 1914.
1,156,284.
Patented Oct. 12, 1915.
2 SHEETS—SHEET 1.
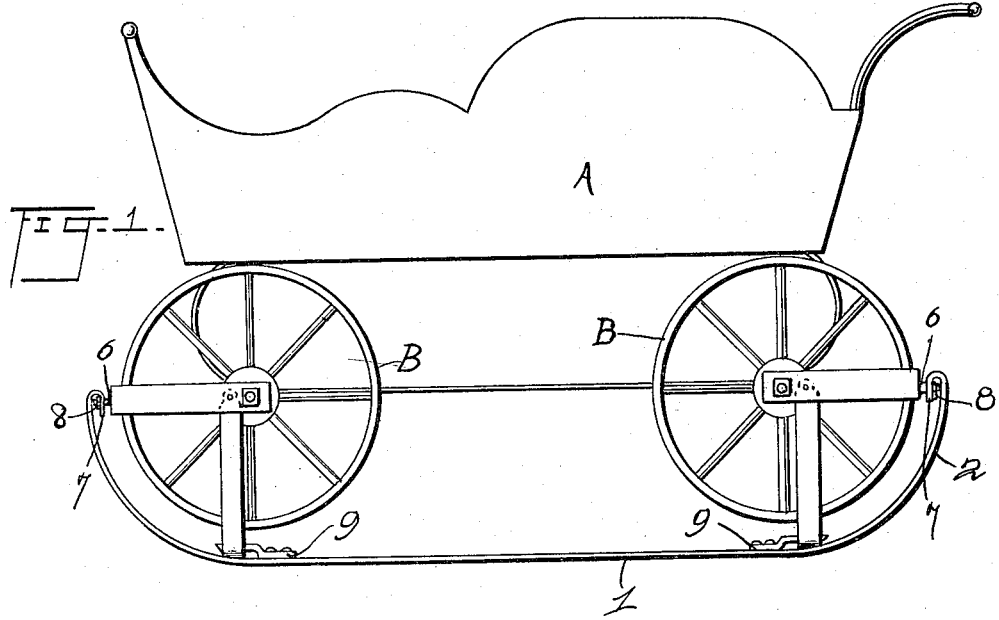
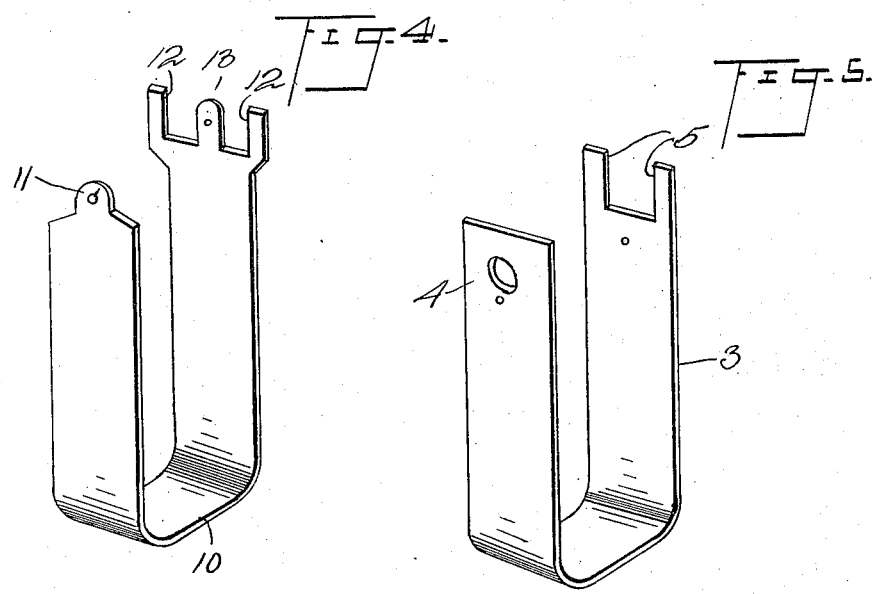
Inventor
W. E. Graham.

W. E. GRAHAM.
COMBINED WHEEL GUARD AND SLEIGH RUNNER.
APPLICATION FILED SEPT. 29, 1914.
1,156,284.
Patented Oct. 12, 1915.
2 SHEETS—SHEET 2.
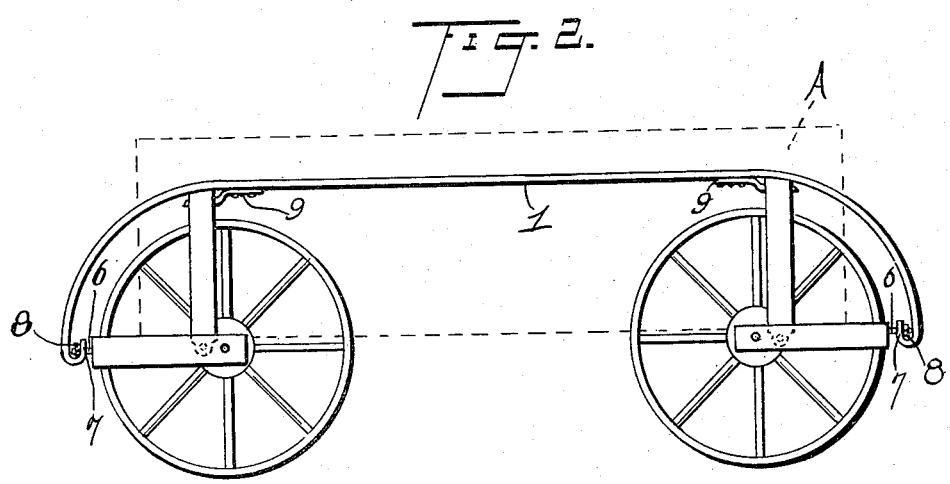
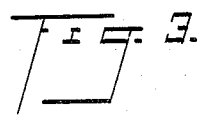
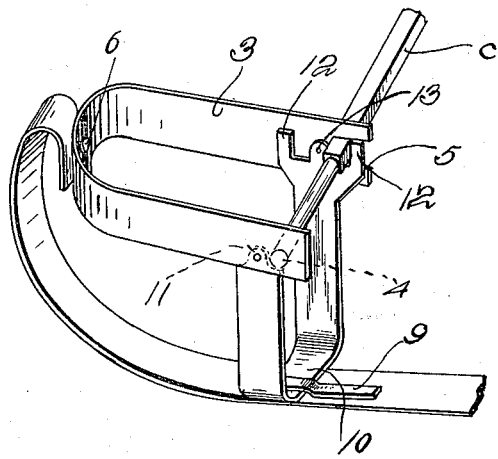
Inventor
W. E. Graham.
Witnesses
By
COLUMBIA PLANOGRAPH CO., WASHINGTON, D. C.

UNITED STATES PATENT OFFICE.

WILLIAM ELMO GRAHAM, OF GRAND JUNCTION, COLORADO.

COMBINED WHEEL-GUARD AND SLEIGH-RUNNER.

1,156,284.  Specification of Letters Patent.  Patented Oct. 12, 1915.

Application filed September 29, 1914. Serial No. 864,140.

*To all whom it may concern:*

Be it known that I, WILLIAM ELMO GRAHAM, a citizen of the United States, residing at Grand Junction, in the county of Mesa and State of Colorado, have invented certain new and useful Improvements in Combined Wheel-Guards and Sleigh-Runners; and I do hereby declare the following to be a full, clear, and exact description of the invention, such as will enable others skilled in the art to which it appertains to make and use the same.

My invention relates to improvements in combined wheel guards and sleigh runners and resides in the provision of such a device that is of simple construction, capable of being readily attached and detached and operated so as to be used as a sleigh runner or wheel guard as the case may be and is particularly designed for use in connection with baby carriages, go-carts and toy wagons or similar children's vehicles.

An object of importance is to provide a combined wheel guard and sleigh runner that employs novel means whereby it may be readily attached to the axle of a vehicle and secured in position to act as a sleigh runner or wheel guard as desired.

Another object is to provide a device of the character described that is of simple construction, is reliable and efficient in operation and which is inexpensive to manufacture.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a side elevation of a baby carriage showing my combined runner and wheel guard attached thereto and in position to serve as a runner, Fig. 2 is a side elevation showing the device secured to serve as a wheel guard, Fig. 3 is a detail enlarged perspective view showing the means for attaching the guard to the axle of the vehicle with the wheel removed and a portion of the runner and guard member attached thereto, Fig. 4 is a detail perspective view of the attaching members, and Fig. 5 is a similar view of a coöperating supporting member.

Referring to the drawings by characters of reference, the letter A designates as an entirety a baby carriage to which my improved device has been shown attached, and B wheels that are mounted in the usual manner upon axles C.

My improved combined wheel guard and sleigh runner consists of a relatively flat runner and wheel guard bar 1 that is provided with curved ends 2 which extend in the same direction. A fixed U-shaped supporting member 3 is secured to the axle C and extends outwardly therefrom in a horizontal plane. One end of the member 3 is fixed as at 4 to the outer end of the axle C and the other is slotted as at 5 so as to receive the axle C. The axle C is preferably square and the slot 5 is so formed as to prevent turning of the member 3 as it snugly receives said axle.

A bolt 6 is inserted through the intermediate portion of the body portion or bight portion of the U-shaped member 3 and through the bent back ends 7 of the curved ends 2. A nut 8 is turned upon the outer end of the bolt 6 to hold the downturned or bent back ends 7 against removal accidentally from the bolt 6. The bent back portions 7 loosely receive the bolt 6 so that they are free to turn relative to the bolt 6. It will thus be seen that the bar 1 may be swung from overhanging relation to the wheels as shown in Fig. 2 to act as a wheel guard to down position as shown in Fig. 1 to serve as a sleigh runner. Carried adjacent to the ends of the straight portion of the bar 1 are brackets or clips 9 that are so arranged as to engage upon and hold U-shaped and pivoted locking and bracing members 10 that are disposed in a vertical plane and designed to be swung into different positions as illustrated in Figs. 1 and 2. On one end of the U-shaped locking and bracing member is formed a tongue or ear 11 that is pivoted upon the outside arm of the member 3 at a point spaced from the end of said arm. The other end of the U-shaped locking and bracing member 10 is enlarged laterally and provided with a pair of end opening slots 12 therein which are designed to receive the axles C. The forming of these slots 12 provides a tongue or lug portion 13 that is pivoted as at 14 to the inner arm of the member 3 at a point spaced from the end and upon the inside of said arm. This last named arm is so secured that when the member 10 is in up or down position one of the slots 12 is arranged to receive the axle C to prevent turning or movement of the member 10 relative to the one 3.

In operation, assuming that the device is in position as illustrated in Fig. 1 and serving as a sleigh runner on a wheeled vehicle the members 10 and 3 are arranged upon opposite sides of the wheel and connected with the axle so that the runner and guard bar 1 is held in a reliable manner. When the device is in this position, the lower end or body portion of the member 10 is braced. When it is desired to change the position of the member 10 and bar 1 so that it may serve as a wheel guard and assumes the position as illustrated in Fig. 2 in the drawings, the members 10 are moved so as to be free from the clips or brackets 9 and the bar 1 is then swung from the position in Fig. 1 to the position shown in Fig. 2 and over the wheels B of the vehicle. The members 10 are then swung into upright position above the member 3 as shown in Fig. 2 and one of the slots 12 is fitted upon the axle C so as to hold the member 10 in position. The body portion of the member 10 is brought under the clip 9 and the device is locked in converted position. The clips 9 are preferably formed of spring material.

It will be readily seen that I have provided a simple, inexpensive and effective device that will serve as a wheel guard and also a sleigh runner for baby carriages, children's express wagons and other vehicles and may be operated without necessitating any changes in the construction of the device to which it is attached.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

1. A combined wheel guard and sleigh runner for vehicles including a bar having a curved end, a substantially horizontal supporting member having means for securing it to an axle, the said curved end of the bar being pivoted to the supporting member to enable the bar to swing to a position above or below the axle, a locking member pivoted to the said supporting member and arranged to be moved above and below the same, and means carried by the bar for detachably engaging the locking member whereby the latter will be held against movement and retained in its up or down position.

2. A combined wheel guard and sleigh runner for vehicles including a bar having curved ends, fixed substantially U-shaped supporting members having means for securing them to the axles of a vehicle and disposed substantially in a horizontal plane, the curved ends of the bar being each secured to a supporting member, a substantially U-shaped locking member pivoted to the supporting member and means for detachably securing the locking member to the said bar.

3. A combined wheel guard and sleigh runner for vehicles including a bar having curved ends, fixed U-shaped supporting members having means for securing them to the axles of a vehicle and being disposed in substantially a horizontal plane, the curved ends of the bar being each pivoted to a supporting member, substantially U-shaped locking members pivoted to the supporting memebrs adjacent to the ends thereof, means for detachably securing the U-shaped locking members to the supporting members, and means for holding the locking members in adjusted position.

4. The combination with a vehicle, of a combined wheel guard and sleigh runner comprising a bar having a curved end, a supporting member secured to the axle of the vehicle, the curved end of the bar being pivoted to the said supporting member to enable the bar to swing to a position above or below the wheels of the vehicle, a substantially U-shaped locking member carried by the supporting member and pivoted at one end thereto, said locking member being provided with spaced slots arranged to engage with the adjacent axle of the vehicle, and a spring clip mounted on the bar and arranged to engage the locking member to hold the same in adjusted position.

In testimony whereof I affix my signature in presence of two witnesses.

WILLIAM ELMO GRAHAM.

Witnesses:
 CHAS. P. McDONALD,
 H. COLLINS HAY.

Copies of this patent may be obtained for five cents each, by addressing the "Commissioner of Patents, Washington, D. C."